Nov. 20, 1956 J. G. VASEY 2,771,107
SHAKE SPLITTING MACHINES
Filed May 17, 1955 5 Sheets-Sheet 1
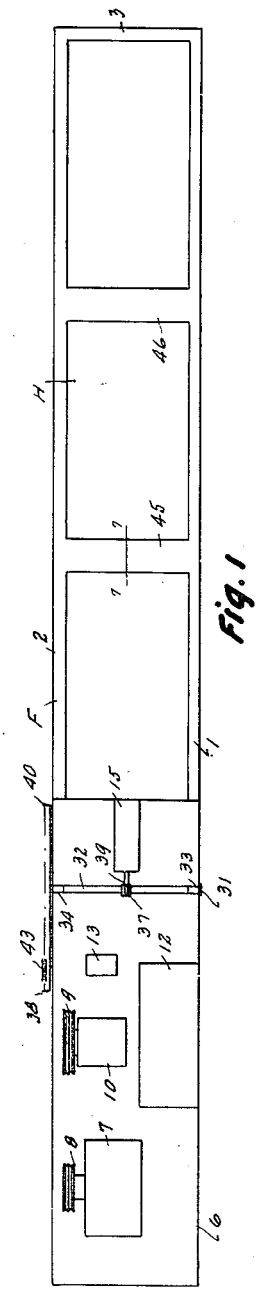
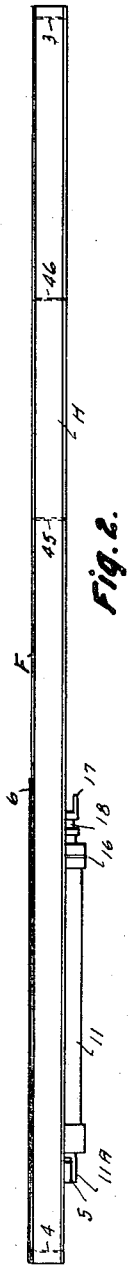
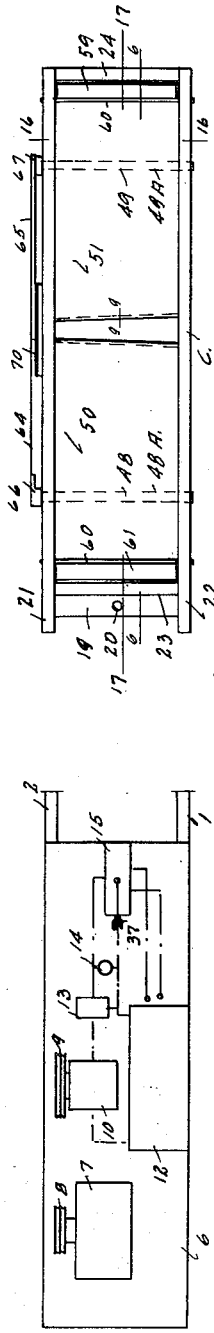
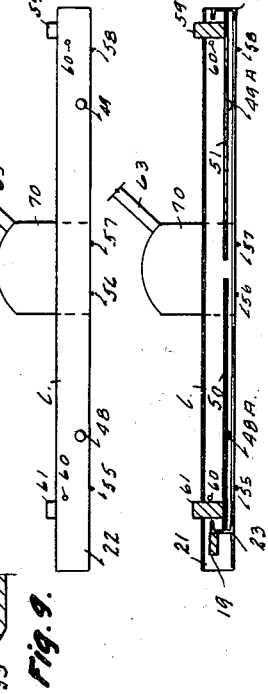
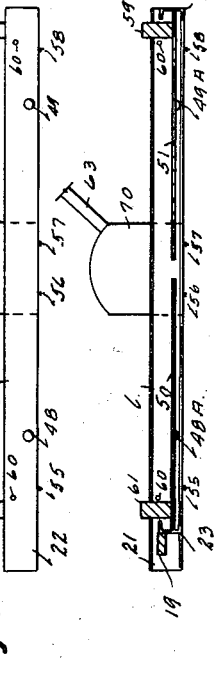
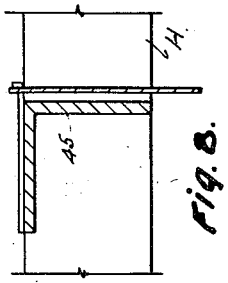
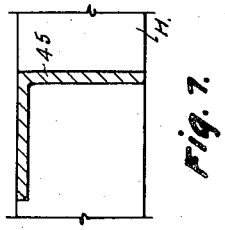
John G. Vasey
Inventor

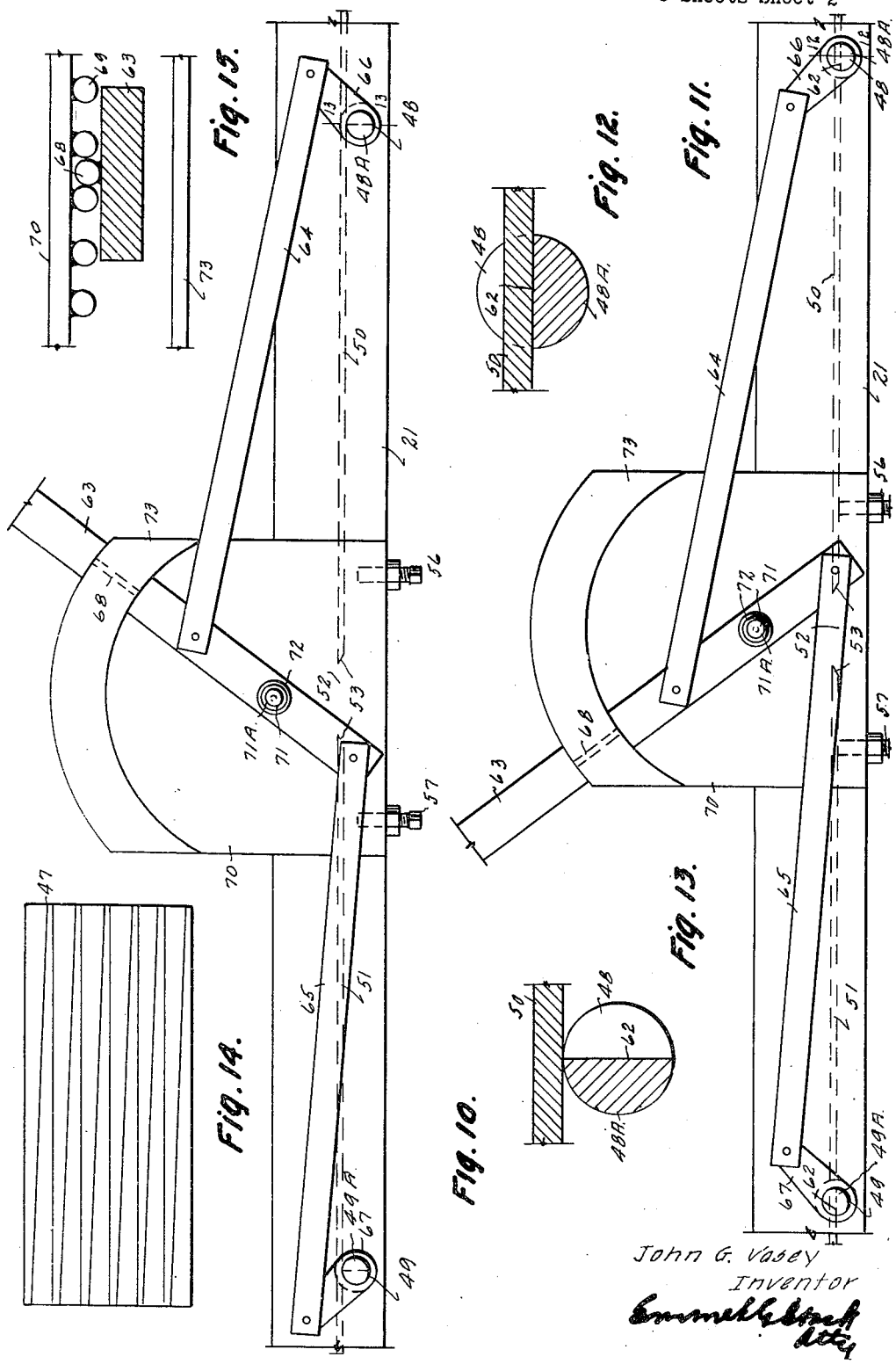

Nov. 20, 1956  J. G. VASEY  2,771,107
SHAKE SPLITTING MACHINES
Filed May 17, 1955  5 Sheets-Sheet 3

John G. Vasey
Inventor

Nov. 20, 1956  J. G. VASEY  2,771,107
SHAKE SPLITTING MACHINES
Filed May 17, 1955  5 Sheets-Sheet 4
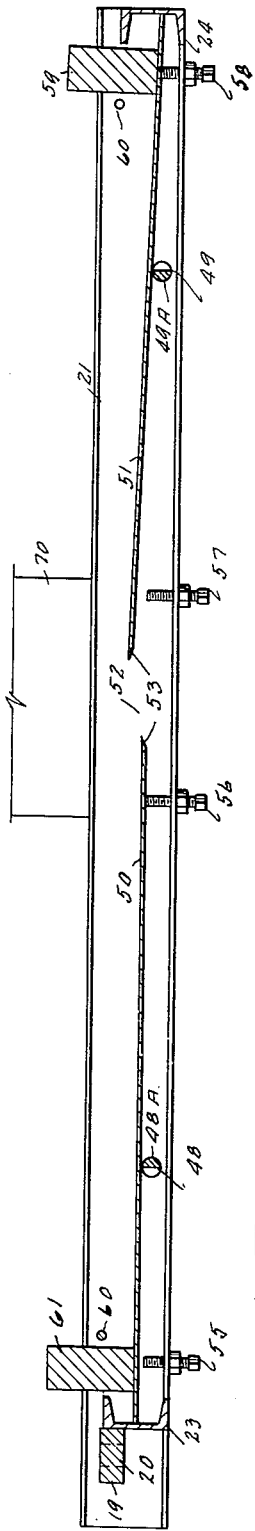
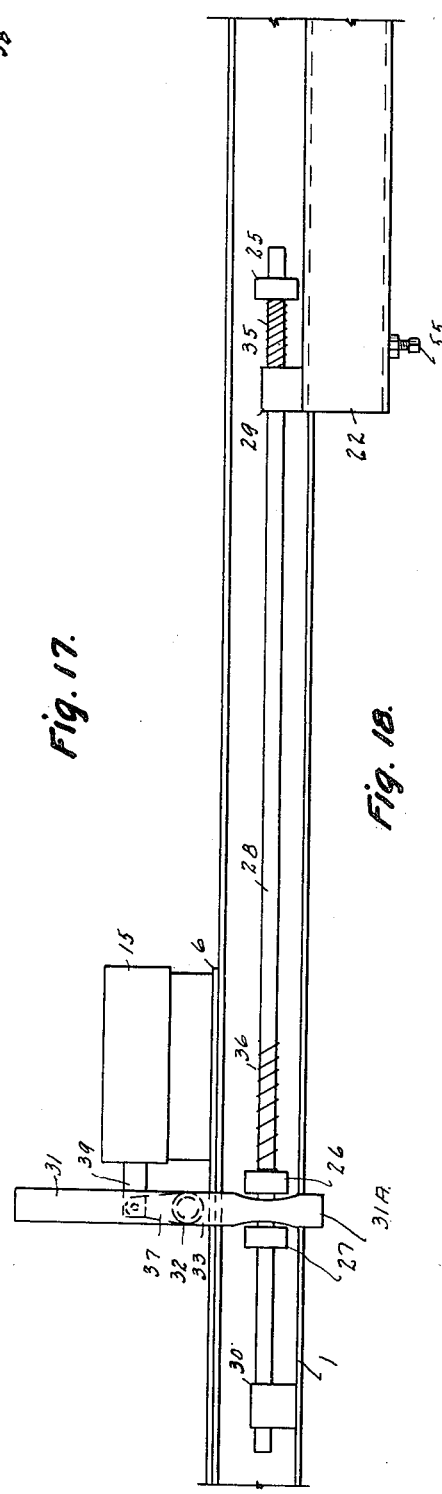
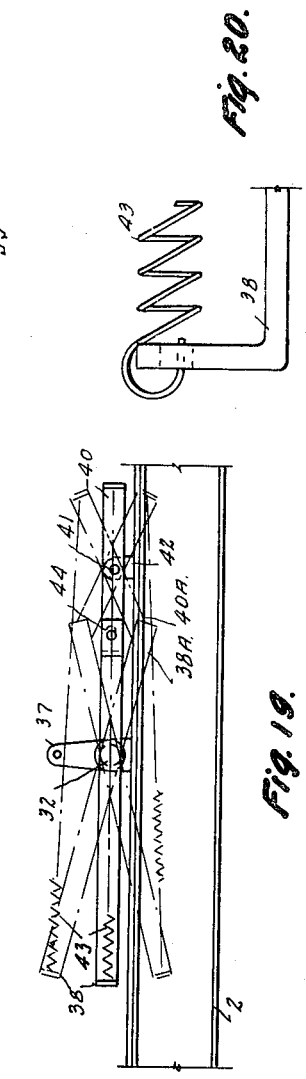
John G. Vasey
Inventor Nov. 20, 1956  J. G. VASEY  2,771,107
SHAKE SPLITTING MACHINES
Filed May 17, 1955  5 Sheets-Sheet 5

John G. Vasey
Inventor

United States Patent Office 2,771,107
Patented Nov. 20, 1956

2,771,107
SHAKE SPLITTING MACHINES
John G. Vasey, Portland, Oreg.

Application May 17, 1955, Serial No. 509,035

6 Claims. (Cl. 144—193)

My invention relates to a machine for spliting shakes from a bolt of wood.

The principal object I had in mind during the development of my machine was to be able to make more perfect shakes, namely, those with uniform butts and reasonably uniform tips.

Shakes were made by our forefathers to cover the roofs and sides of their buildings. They are used today for the same purpose where a rustic appearance is desired.

The tools necessary to hand-split shakes are a saw, axe, froe, and mallet. A length of log is split and trimmed up into sections having a horizontal cross section resembling that of the vertical section of the frustum of a cone. Such a section, known as a bolt, has two flat grain faces and two vertical grain faces or faces in which the annual rings are at right angles thereto. The shakes are split off a vertical grain face of the bolt. The length of the vertical grain face of the bolt fixes the width of the shake. The froe is a heavy backed knife having a handle at right angles to the blade. The operator aligns the blade parallel to the bolt face to split off therefrom a shake having the desired butt thickness. The shake is split or wedged off the bolt by striking the back of the froe a sharp blow with the mallet. For some unknown reason the shake split off does not usually hold the butt thickness throughout its length but tends to taper from the butt end to the tip end. Men learn from experience how to hold the tips to a predetermined thickness. Due to the natural tendency of the shake to taper off the operator first forms the butt on one end of the bolt and then on the other end of said bolt.

The practice of forming the butt on alternate ends of the bolt is common to most machines built for the mechanical splitting of shakes. I follow the same practice in the machine which I am about to describe and which I have illustrated in the accompanying drawings.

Figure 16:
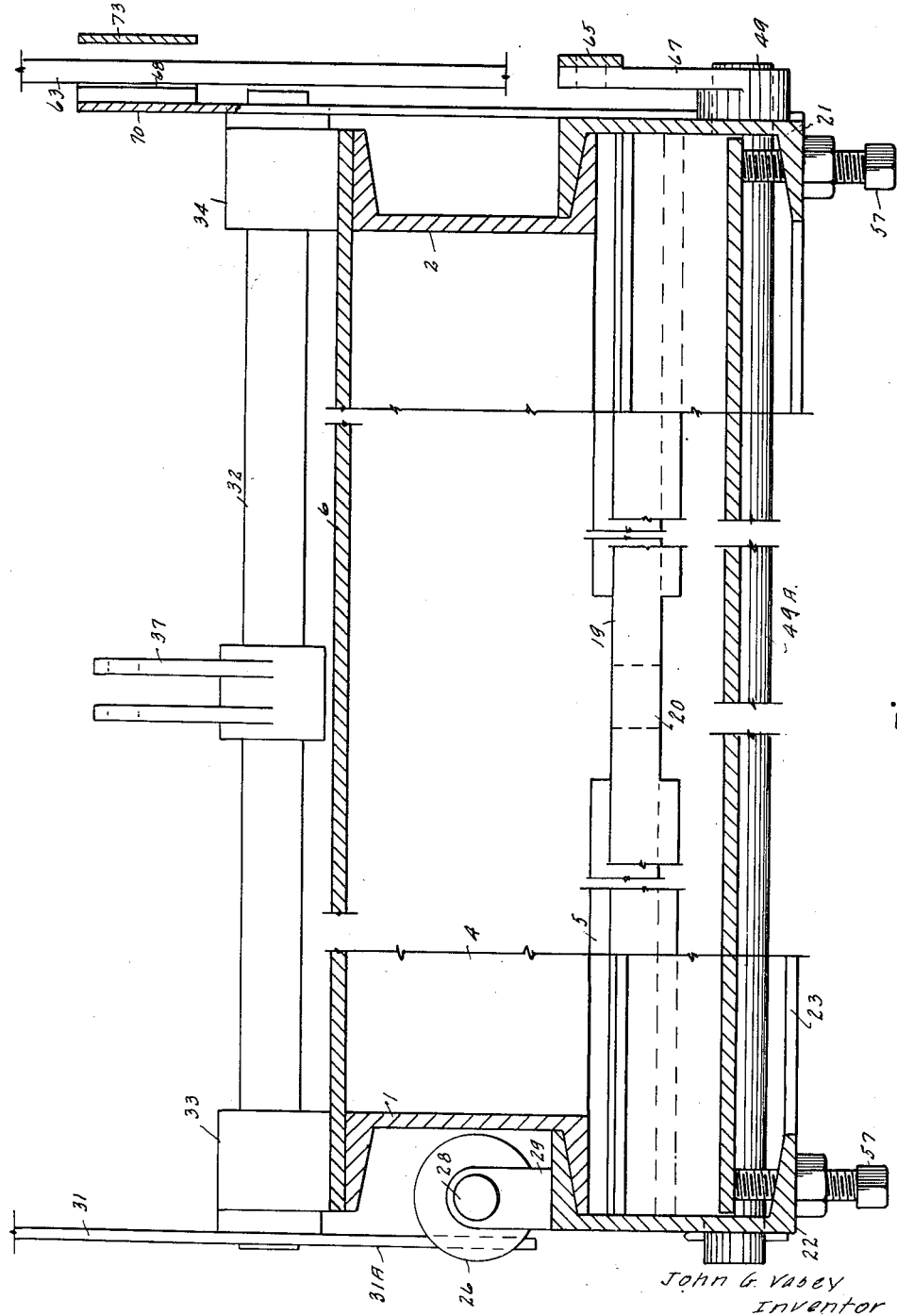
Figure 21:
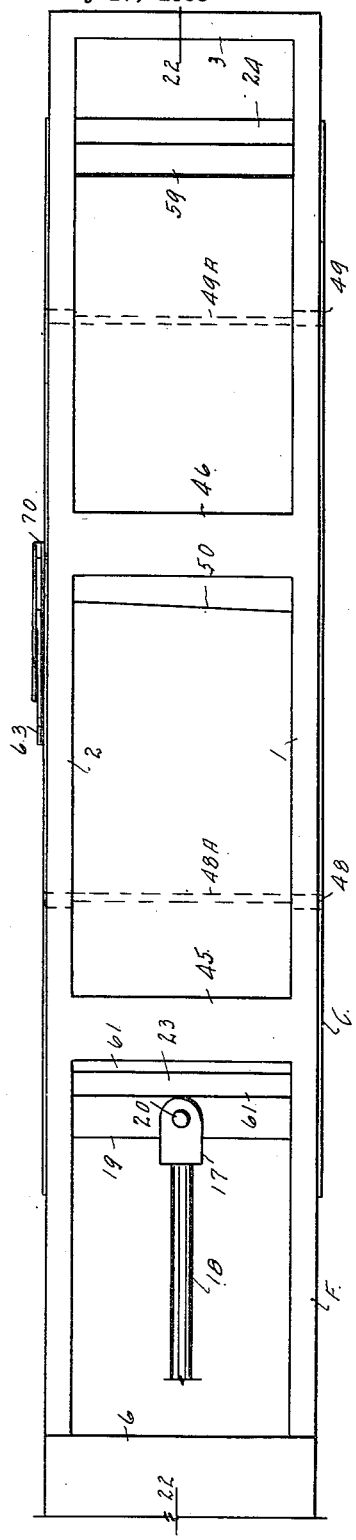
Figure 22:
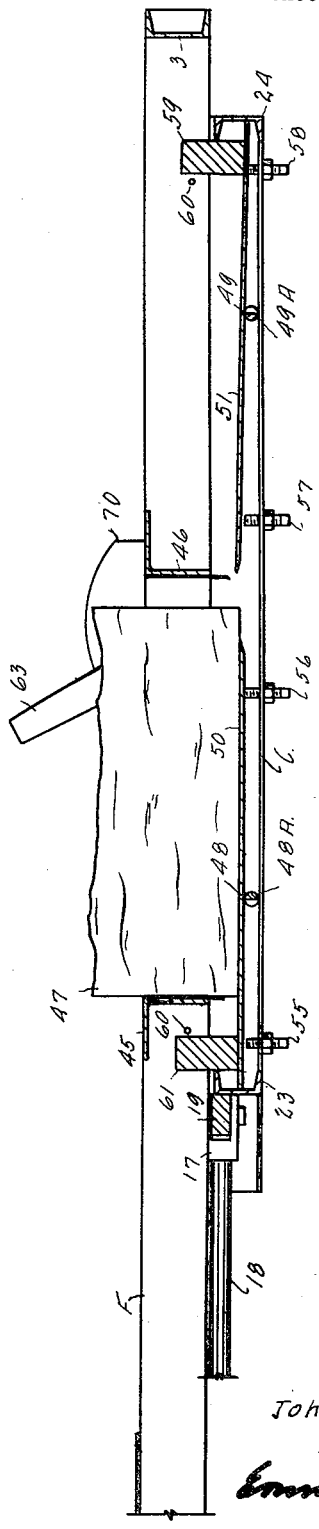

Fig. 1, of these drawings is a plan view of the machine frame showing diagrammatically the location of the operating elements; Fig. 2, is a side view of said frame; Fig. 3, is a plan view showing the piping arrangement of the operating elements; Fig. 4, is a plan view of the carriage; Fig. 5, is a side view of Fig. 4; Fig. 6, is a vertical section on the line 6—6 of Fig. 4; Fig. 7, is a vertical section on the line 7—7 of Fig. 1; Fig. 8 is a similar section showing the use of an auxiliary hinged bumper for thin spalts; Fig. 9, is a vertical section on the line 9—9 of Fig. 4, enlarged; Fig. 10, is a side elevation showing the cam adjusting mechanism for the carriage table; Fig. 11, is an elevation similar to Fig. 10, but showing the opposite positioning of the cams; Fig. 12, is an enlarged section on the line 12—12 of Fig. 11; Fig. 13, is an enlarged section on the line 13—13 of Fig. 10; Fig. 14, shows a bolt and the way the shakes would be taken therefrom; Fig. 15, is a plan view showing the holding means for the table adjusting lever; Fig. 16, is an enlarged cross section thru the carriage and frame on the line 16—16 of Fig. 4; Fig. 17, is an enlarged vertical section lengthwise of the carriage on the line 17—17 of Fig. 4; Fig. 18, is an enlarged elevation of the carriage travel regulating means; Fig. 19, is an enlarged elevation of the carriage reversing mechanism; Fig. 20, is an enlarged end of the reversing mechanism levers. Fig. 21 is a plan view showing the relationship of the carriage and frame, Fig. 22 is a section on the line 22—22 of Fig. 21.

Thruout the drawings and the specification similar numerals refer to similar parts.

The frame F consists of the channel side members 1 and 2 with their flanges extending outwardly. These side channels 1 and 2 are tied together by the end channel members 3 and 4, the cylinder support member 5, and the top cover plate 6 on which are mounted the gas engine 7 (or electric motor) having V-pulleys 8 over which belts (not shown) operate to turn the pulleys 9 on the pump 10 by means of which oil is brought under pressure to operate the carriage-operating cylinder 11. Oil from the reservoir 12 passes thru the pump 10, pressure relief valve 13, control valve 14, and is directed alternately to each end of the cylinder 11 by the 4-way valve 15. The cylinder 11 is supported at one end by the jaws 11A which engage the cylinder support member 5. The opposite end is supported by the stirrup 16 depending from the cover plate 6 as shown in Fig. 2. The crosshead 17 on the cylinder piston rod 18 engages the cross bar 19 on the carriage frame C and is held in place by a king pin (not shown) which passes thru a hole 20 in said bar. It follows that the carriage C will follow the reciprocating movement of the cylinder piston head (not shown). The description of the means to control the reciprocating movement of the carriage C follows a general description of the carriage frame C.

This frame C consists of two channel side members 21 and 22 with their flanges turned inwardly and overlapping the outwardly extending flanges on the frame F side channels 1 and 2 as shown in Fig. 16 in particular. These channel side members 21 and 22 are tied together at their ends by the channel members 23 and 24 and the cross bar 19 in which is the hole 20 thru which the king pin (not shown) passes to couple the cylinder crosshead 17 to the carriage C.

The travel of the carriage C is fixed by the location of the collars 25, 26, and 27 Fig. 18, adjustable to position on the rod 28 one end of which is slidably mounted in the bearing 29 positioned on the top flange of the carriage side channel 22 and the other end of which is slidably mounted in the bearing 30 positioned on the bottom flange of the frame side channel 1. The collars 26 and 27 are spaced apart for the reception of the lower portion 31A of the lever 31 secured to the rocker shaft 32 supported by the bearings 33 and 34 mounted on the frame cover sheet 6. See Figs. 1, 16, and 18 Loosely mounted on the rod 28 between the collar 25 and the bearing 29 is an open coil spring 35, and between said bearing 29 and the collar 26 is a second open coil spring 36.

The lever 31, the rocker arm 37, and the lever 38 are all secured to the same rocker shaft 32 and their position is shown in solid lines in Figs. 18 and 19, at the instant of reversal of the 4-way valve 15 whose piston rod 39 is hingedly secured to the rocker arm 37. At the above mentioned instant the lever 38 is in alignment with the lever 40 whose rocker pin 41 is carried by the bearing 42 mounted on the cover plate 6. One end of each of the levers 38 and 40 are hingedly connected together while their opposite ends have connected thereto the ends of a closed coil extension spring 43. A slotted hole 44 is provided in the lever 40 so that the levers 38 and 40 may be moved to either the upper or lower positions as shown by their broken outlines in Fig. 19. The levers 38 and 40 are in and remain in the lower position prior to the instant the forwardly moving carriage C engages and begins to compress the spring 36, move the bottom 31A of the lever 31 forward, the end of the lever 38 upwardly, and the end 40A of the lever 40 downwardly. As the lever end 38A moves upwardly and the lever end 40A downwardly the spring 43 is tensioned until the levers 38 and 40 come into alignment at which instant the spring 43 following the line of least resistance quickly moves said levers over center into their upper position at which time the 4-way valve 15 reverses and delivers oil into the opposite end of the cylinder 11 whereby the carriage C is moved rearwardly. As the carriage C moves rearwardly it engages and compresses the spring 35 against the collar 25 thus moving the rod 28 rearwardly along with the collars 26 and 27 and the bottom 31A of the lever 31. As the carriage movement continues the spring 43 causes the levers 38 and 40 to again move over the center but in the opposite direction. When once started the carriage C continues to reciprocate as long as the pump 10 delivers oil to the operating cylinder 11.

Also tying the frame side channels 1 and 2 together are the angle members 45 and 46 (Figs. 1, 7 and 8) which are spaced apart to form the hopper H for the reception of the bolt 47 shown in Fig. 14. Journalled in the carriage side channel members are the ends of the cam shafts 48 and 49 which have their portions intermediate the webs of the channel members 21 and 22 milled to a half round configuration as shown in Figs. 10, 11, 12, 13, and 16. These half round cam portions 48A and 49A serve as fulcrums on which rest the knife plates 50 and 51. These knife plates 50 and 51 are plain flat plates which are loosely confined by the channel side members 21 and 22 and the channel tie members 23 and 24 as shown in Figs. 16 and 17. The adjacent edges of the knife plates 50 and 51 are bevelled as shown in Figs. 9 and 17, said bevelled edges being spaced apart to form a throat 52 for the passage of a shake down under the bevelled edges 53. The bevelled edges 53 on the knife plates 50 and 51 are not parallel, as is shown in Fig. 4, in order that a shearing contact may be made with a bolt 47. In each lower flange 54 of the carriage channel side members 21 and 22 are positioned the cap screws 55, 56, 57 and 58, each provided with a jamb nut as shown in Figs. 16 and 17. Referring to Fig. 17, it will be noted that the knife plate 50 is resting upon the cam portion 48A and the cap screws 56 while the knife plate 51 rests upon the cam portion 49A and the cap screws 58, being held against said cap screws 58 by the counterweight 59 which is loosely confined between the top flanges of the channel side members 21 and 22 and the tie channel 24 and the rod 60 which extends between the channel side members 21 and 22. The effect of the counterweight 61 resting upon the knife plate 50 is offset by the weight of the bolt being cut plus mechanically applied pressure thereto (none being shown) or by pressure applied directly to the bolt by the operator. Fig. 17, shows the position and relation of the knife plates at the instant the carriage C is ready to move forward to engage a bolt resting upon the knife plate 50. As the carriage C is about to start its rearward movement the knife plate 50 rests upon the cam portion 48A and the cap screws 55 while the knife plate 51 rests upon the cam portion 49A and the cap screws 58. Fig. 11 shows the knife plates supported on the flat face 62 of the cam portions 48A and 49A while in Fig. 10, the knife plates are supported at the junction point of the flat and rounded surfaces of the cam portions. The cam portions 48A and 49A may be brought to the positions shown in Figs. 10 and 11, or any intermediate position, by means of the lever 63 connected by the links 64 and 65 to the rocker arms 66 and 67 secured to the cam shafts 48 and 49, respectively. This lever 63 has a tooth 68 adapted to be positioned between any of the teeth 69 (Fig. 15) forming the quadrant on the upper portion of the plate 70 secured to the side channel 21. In order that the tooth 68 may be moved to any desired position the lever 63 is slidable endwise of and on the pin 71 projecting from the plate 70. A conical spring 72 is positioned between a head 71A on the pin 71 and the lever 63 to provide the flexibility needed to move the tooth 68 to any desired position. A guard 73 attached to and spaced from the plate 70 keeps the lever 63 from being moved out of bounds. By the manipulation of this lever 63 the knife plates may be adjusted to cut shake butts of any desired thickness within the range of the machine.

Once the knife plates, cam portions, and stop screws are adjusted for the shake to be cut the operator places a bolt in the hopper H and applies sufficient pressure thereagainst to bring the knife plate into contact with the cap or stop screws adjacent its bevelled end. The shakes split or wedged off the bolt pass thru the throat and drop free beneath the machine.

With my floating knife construction I get a better product than is to be had where a knife is mounted free from and above the two tables.

It is pointed out that many modifications may be made in my machine without departing from the basic principle involved therefore I do not limit my invention to the exact disclosures but extend it to all that comes fairly within the scope of the appended claims.

The carriage is the gist of my invention and what I claim as new over the art is hereinafter set forth.

I claim:

1. In a shake splitting machine, a carriage adapted for reciprocable movement having a frame with four sides arranged to enclose a space between said sides, a pair of spaced apart knife plates loosely confined within the enclosed space having adjacent edges oppositely bevelled to form a splitting wedge on each knife plate, a fulcrum member for and intermediate the ends of each knife plate providing support for said knife plate, means to adjust the height of the point of support on the fulcrum member, and means to limit the vertical movement of each knife plate fore and aft of its fulcrum member.

2. Such a structure as in claim 1 wherein the fore and aft limit means are vertically adjustable screws.

3. In a shake splitting machine the combination of a pair of spaced apart freely floating knife plates which have their adjacent edges oppositely bevelled to form a splitting wedge on each knife plate and a cam bar upon which a knife plate is freeely and teeterably supported.

4. In a shake splitting machine the combination of a pair of spaced apart freely floating knife plates which have their adjacent edges oppositely bevelled to form a splitting wedge on each knife plate, a cam bar upon which a knife plate is freely and teeterably supported, and a counterweight resting upon the non bevelled end of each knife plate.

5. In a shake splitting machine the combination of a pair of spaced apart freely floating knife plates which have their adjacent edges oppositely bevelled to form a splitting wedge on each knife plate, and a fulcrum bar upon an eccentric portion of which a knife plate is teeterably supported when said eccentric portion is raised, said fulcrum bar being adapted to be rotated to raise and lower the knife plate.

6. In addition to the structure of claim 5, said fulcrum bar having cylindrical end portions and said eccentric portion being an intermediate knife supporting portion of half round configuration, and means to move the flat face of the half round portion of the fulcrum bar from a horizontal plane to a vertical plane.

References Cited in the file of this patent

UNITED STATES PATENTS

| | | |
|---|---|---|
| 885,201 | Street | Apr. 21, 1908 |
| 2,612,916 | Bailey | Oct. 7, 1952 |
| 2,616,461 | Bearce | Nov. 4, 1952 |